United States Patent
Sargaison et al.

(10) Patent No.: US 7,957,952 B2
(45) Date of Patent: *Jun. 7, 2011

(54) TRANSLATION BLOCK INVALIDATION PREHINTS IN EMULATION OF A TARGET SYSTEM ON A HOST SYSTEM

(75) Inventors: Stewart Sargaison, Foster City, CA (US); Victor Suba, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,634

(22) Filed: Aug. 12, 2010

(65) Prior Publication Data

US 2010/0305938 A1     Dec. 2, 2010

Related U.S. Application Data

(63) Continuation of application No. 11/696,684, filed on Apr. 4, 2007, now Pat. No. 7,792,666.

(51) Int. Cl.
*G06F 9/455* (2006.01)
(52) U.S. Cl. ........... 703/26; 703/23; 717/136; 717/138; 717/140
(58) Field of Classification Search .......... 703/23, 703/24, 26; 717/126, 134–138, 140, 154
See application file for complete search history.

(56) References Cited

U.S. PATENT DOCUMENTS

| | | | |
|---|---|---|---|
| 4,587,612 A | | 5/1986 | Fisk et al. |
| 4,791,558 A | * | 12/1988 | Chaitin et al. ............ 717/140 |
| 5,546,552 A | * | 8/1996 | Coon et al. ............... 712/209 |
| 5,551,015 A | | 8/1996 | Goettelmann et al. |
| 5,560,013 A | | 9/1996 | Scalzi et al. |
| 5,649,203 A | | 7/1997 | Sites |
| 5,751,982 A | * | 5/1998 | Morley ..................... 712/209 |

(Continued)

FOREIGN PATENT DOCUMENTS

EP     0945796     9/1999

(Continued)

OTHER PUBLICATIONS

Notice of Allowance and Fee(s) dated Apr. 12, 2010 for U.S. Appl. No. 11/696,684.

(Continued)

*Primary Examiner* — Kamini S Shah
*Assistant Examiner* — Kibrom Gebresilassie
(74) *Attorney, Agent, or Firm* — Joshua D. Isenberg; JDI Patent (57) ABSTRACT

Emulation systems and method involving invalidating blocks of translated code in emulation of a target system on a host system in are disclosed. One or more blocks of target system code are translated by the host system to produce one or more corresponding blocks of translated code. The host system uses one or more native target system instructions as hints to invalidate or potentially invalidate one or more blocks of translated code. Blocks containing such hints cause the host system to mark some or all of the one or more blocks of translated code as potentially invalid. The potentially invalid blocks may be re-translated immediately. Alternatively, the potentially invalid blocks may be checked to see if the code in these blocks has been modified. If the code has been modified, corresponding blocks of target code may be re-translated.

17 Claims, 4 Drawing Sheets

U.S. PATENT DOCUMENTS

| | | | |
|---|---|---|---|
| 5,768,593 A * | 6/1998 | Walters et al. | 717/141 |
| 5,790,825 A * | 8/1998 | Traut | 712/209 |
| 5,815,720 A | 9/1998 | Buzbee | |
| 6,016,542 A | 1/2000 | Gottlieb et al. | |
| 6,031,992 A | 2/2000 | Cmelik et al. | |
| 6,047,381 A | 4/2000 | Klein | |
| 6,115,054 A | 9/2000 | Giles | |
| 6,142,682 A * | 11/2000 | Skogby | 703/26 |
| 6,151,670 A | 11/2000 | Lange et al. | |
| 6,158,047 A | 12/2000 | Le et al. | |
| 6,247,172 B1 | 6/2001 | Dunn et al. | |
| 6,314,560 B1 | 11/2001 | Dunn et al. | |
| 6,327,704 B1 | 12/2001 | Mattson et al. | |
| 6,332,214 B1 | 12/2001 | Wu | |
| 6,397,242 B1 | 5/2002 | Devine et al. | |
| 6,463,582 B1 | 10/2002 | Lethin et al. | |
| 6,502,237 B1 | 12/2002 | Yates et al. | |
| 6,529,862 B1 | 3/2003 | Mann et al. | |
| 6,532,532 B1 | 3/2003 | Eaton et al. | |
| 6,631,514 B1 * | 10/2003 | Le | 717/137 |
| 6,672,963 B1 | 1/2004 | Link | |
| 6,704,925 B1 * | 3/2004 | Bugnion | 717/138 |
| 6,728,950 B2 * | 4/2004 | Davis et al. | 717/136 |
| 6,763,328 B1 | 7/2004 | Egolf et al. | |
| 6,882,968 B1 | 4/2005 | Linden | |
| 6,884,171 B2 | 4/2005 | Eck et al. | |
| 6,993,751 B2 | 1/2006 | Bhansali et al. | |
| 7,000,226 B2 | 2/2006 | Gao et al. | |
| 7,096,460 B1 | 8/2006 | Banning et al. | |
| 7,107,580 B2 | 9/2006 | Zemach et al. | |
| 7,111,096 B1 * | 9/2006 | Banning et al. | 710/100 |
| 7,117,143 B2 | 10/2006 | Wang et al. | |
| 7,181,601 B2 | 2/2007 | Rudd et al. | |
| 7,210,144 B2 | 4/2007 | Traut | |
| 7,260,815 B1 | 8/2007 | Chen et al. | |
| 7,418,580 B1 * | 8/2008 | Campbell et al. | 712/227 |
| 7,624,384 B2 * | 11/2009 | Zhang et al. | 717/136 |
| 7,644,210 B1 * | 1/2010 | Banning et al. | 710/100 |
| 7,770,050 B2 * | 8/2010 | Sargaison et al. | 713/600 |
| 7,792,666 B2 * | 9/2010 | Sargaison et al. | 703/26 |
| 2002/0066086 A1 | 5/2002 | Linden | |
| 2002/0156977 A1 | 10/2002 | Derrick et al. | |
| 2003/0093649 A1 | 5/2003 | Hilton | |
| 2003/0093774 A1 * | 5/2003 | Hilton | 717/138 |
| 2003/0093775 A1 | 5/2003 | Hilton | |
| 2003/0093776 A1 * | 5/2003 | Hilton | 717/138 |
| 2003/0101439 A1 * | 5/2003 | Desoli et al. | 717/148 |
| 2004/0158681 A1 | 8/2004 | Hooker | |
| 2004/0205733 A1 | 10/2004 | Souloglou et al. | |
| 2004/0221273 A1 * | 11/2004 | Sandham et al. | 717/134 |
| 2004/0221278 A1 | 11/2004 | Dankel et al. | |
| 2005/0015754 A1 | 1/2005 | Werner et al. | |
| 2005/0015756 A1 | 1/2005 | Brown et al. | |
| 2005/0015758 A1 * | 1/2005 | North | 717/138 |
| 2005/0149697 A1 | 7/2005 | Enright et al. | |
| 2006/0029234 A1 | 2/2006 | Sargaison | |
| 2006/0114132 A1 * | 6/2006 | Zhang et al. | 341/50 |
| 2007/0180438 A1 | 8/2007 | Suba | |
| 2007/0260446 A1 | 11/2007 | Suba et al. | |
| 2007/0261038 A1 | 11/2007 | Suba et al. | |
| 2007/0261039 A1 | 11/2007 | Sargaison et al. | |
| 2007/0277052 A1 | 11/2007 | Sargaison et al. | |
| 2008/0040093 A1 | 2/2008 | Sargaison et al. | |
| 2008/0052691 A1 * | 2/2008 | Neelakantam et al. | 717/148 |
| 2008/0092151 A1 | 4/2008 | Brown | |

FOREIGN PATENT DOCUMENTS

| | | |
|---|---|---|
| WO | WO2007096602 | 8/2007 |

OTHER PUBLICATIONS

Notice of Allowance and Fee(s) dated Mar. 25, 2010 for U.S. Appl. No. 11/696,699.

Office Action dated Sep. 14, 2009 issued for U.S. Appl. No. 11/696,699.

Kahle et al., "Introduction to the Cell Multiprocessor", IBM Journal of Research and Development, vol. 49, No. 4/5, Jul.-Sep. 2005, pp. 589-604.

Office Action dated Oct. 6, 2009 issued for U.S. Appl. No. 11/696,684.

Office Action dated Nov. 13, 2008 issued for U.S. Appl. No. 11/700,448.

Notice of Allowance and Fee(s) Due dated Apr. 21, 2009 issued for U.S. Appl. No. 11/700,448.

Eichenberger, A, E et al.—Optimizing Complier for a CELL Processor, 2005, IEEE, 12 pages.

McNairy, C et al.—Montecio: A Dual-Core, Dual Thread Itanium Processor, 2005, IEEE, pp. 10-20.

Smelyanskiy M. et al :"Register Queues: A New Hardware/Software Approach to Efficient Software Pipelining"—IEEE, 2000, pp. 3-12.

Proebsting T. et al.: "Probabilistic Register Allocation", ACM SIGPLAN Notices, vol. 27, No. 7, Jul. 1, 1992, pp. 300-310.

European Search Report for European Application No. 07761060 (International application No. PCT/US2007/067142) dated Mar. 30, 2009, 8 pages.

European Search Report for European Application No. 07761064 (International application No. PCT/US2007/067146) dated Apr. 6, 2009, 7 pages.

International Search Report and written Opinion of the International Searching Authority dated Jul. 30, 2008 issued for International patent application No. PCT/US07/67146.

Wang. ISCC 2005—"The CELL Microprocessor Real World Technologies"—Feb. 2005, pp. 1-9.

International Search Report and Written Opinion of the International Searching Authority—International application No. PCT/US07/67142 dated May 21, 2008.

International Search Report and Written Opinion of the International Searching Authority—International application No. PCT/US07/67133 dated Feb. 21, 2008.

U.S. Appl. No. 60/746,273, entitled "Method and Apparatus for Resolving Clock Management Issues in the Emulation Involving Both Interpreted and Translated Code" filed May 3, 2006.

U.S. Appl. No. 60/746,267, to Stewart Sargaison, et al. "Translation Block Invalidation Prehints in Emulation of a Target System on a Host System", filed May 3, 2006.

U.S. Appl. No. 60/746,268, to Stewart Sargaison, et al. "Register Mapping in Emulation a Target System on a Host System", filed May 3, 2006.

U.S. Appl. No. 60/797,762, to Victor Suba, entitled "Stall Prediction Thread Management", filed May 3, 2006.

U.S. Appl. No. 60/797,435, to Victor Suba et al., entitled "DMA and Graphics Interface Emulation", filed May 3, 2006.

U.S. Appl. No. 60/797,761, to Victor Suba et al., entitled "Code Translation and Pipeline Optimization", filed May 3, 2006.

U.S. Appl. No. 60/763,568, to Victor Suba, entitled "Branch Prediction Thread Management" filed Jan. 30, 2006.

Office Action dated Sep. 17, 2008 issued for U.S. Appl. No. 11/696,691.

Final Office Action dated Mar. 17, 2009 issued for U.S. Appl. No. 11/696,691.

Advisory Action dated Jun. 1, 2009 issued for U.S. Appl. No. 11/696,691.

Office Action dated Dec. 23, 2009 issued for U.S. Appl. No. 11/696,691.

Notice of Allowance dated May 14, 2010 issued for U.S. Appl. No. 11/696,691.

"Energy-Efficient Designed", Kunio Uchiyama, 2005 IEEE.

"A retargetable, ultra-fast instruction set simulator", Zhu and Gajski, 1999.

U.S. Appl. No. 12/834,756, filed Jul. 12, 2010.

Office Action dated Jan. 28, 2011 for U.S. Appl. No. 12/855,656, 10 pages.

* cited by examiner

TRANSLATION BLOCK INVALIDATION PREHINTS IN EMULATION OF A TARGET SYSTEM ON A HOST SYSTEM

CROSS-REFERENCE TO RELATED APPLICATIONS

This application is a continuation and claims the benefit of priority of U.S. patent application Ser. No. 11/696,684, to Stewart Sargaison et al, entitled TRANSLATION BLOCK INVALIDATION PREHINTS IN EMULATION OF A TARGET SYSTEM ON A HOST SYSTEM (Now U.S. Pat. No. 7,792,666) filed Apr. 4, 2007, the entire disclosures of which are incorporated herein by reference.

This application claims the benefit of priority of U.S. provisional application No. 60/746,267, to Stewart Sargaison et al, entitled TRANSLATION BLOCK INVALIDATION PREHINTS IN EMULATION OF A TARGET SYSTEM ON A HOST SYSTEM, filed May 3, 2006, the entire disclosures of which are incorporated herein by reference. This application claims the benefit of priority of U.S. provisional application No. 60/746,268, to Stewart Sargaison et al, entitled REGISTER MAPPING IN EMULATION A TARGET SYSTEM ON A HOST SYSTEM, filed May 3, 2006, the entire disclosures of which are incorporated herein by reference. This application claims the benefit of priority of U.S. provisional application No. 60/746,273 entitled METHOD AND APPARATUS FOR RESOLVING CLOCK MANAGEMENT ISSUES IN EMULATION INVOLVING BOTH INTERPRETED AND TRANSLATED CODE, filed May 3, 2006, the entire disclosures of which are incorporated herein by reference. This application claims the benefit of priority of U.S. provisional application No. 60/797,762, to Victor Suba, entitled STALL PREDICTION THREAD MANAGEMENT, filed May 3, 2006, the entire disclosures of which are incorporated herein by reference. This application claims the benefit of priority of U.S. provisional application No. 60/797,435, to Stewart Sargaison et al, entitled DMA AND GRAPHICS INTERFACE EMULATION, filed May 3, 2006, the entire disclosures of which are incorporated herein by reference. This application also claims the benefit of priority of U.S. provisional application No. 60/797,761, to Stewart Sargaison et al, entitled CODE TRANSLATION AND PIPELINE OPTIMIZATION, filed May 3, 2006, the entire disclosures of which are incorporated herein by reference.

This application claims the benefit of priority of U.S. patent application Ser. No. 11/700,448, filed Jan. 30, 2007 Now U.S. Pat. No. 7,577,826, which claims the benefit of priority of U.S. provisional patent application No. 60/763,568 filed Jan. 30, 2006. The entire disclosures of application Ser. Nos. 11/700,448 and 60/763,568 are incorporated herein by reference.

This application is related to commonly-assigned, application Ser. No. 11/696,691, to Stewart Sargaison et al, entitled REGISTER MAPPING IN EMULATION A TARGET SYSTEM ON A HOST SYSTEM (Now U.S. Pat. No. 7,813,909), filed Apr. 4, 2007, the entire disclosures of which are incorporated herein by reference. This application is related to commonly-assigned, application Ser. No. 11/696,699, to Stewart Sargaison et al, entitled METHOD AND APPARATUS FOR RESOLVING CLOCK MANAGEMENT ISSUES IN EMULATION INVOLVING BOTH INTERPRETED AND TRANSLATED CODE (Now U.S. Pat. No. 7,770,050), filed Apr. 4, 2007, the entire disclosures of which are incorporated herein by reference.

FIELD OF THE INVENTION

Embodiments of this invention relate to emulation of a target computer platform on a host computer platform and more particularly to invalidation of blocks of translated code in emulation of the target platform.

BACKGROUND OF THE INVENTION

The process of emulating the functionality of a first computer platform (the "target system") on a second computer platform (the "host system") so that the host system can execute programs designed for the target system is known as "emulation." Emulation has commonly been achieved by creating software that converts program instructions designed for the target platform (target code instructions) into the native-language of a host platform (host instructions), thus achieving compatibility. More recently, emulation has also been realized through the creation of "virtual machines," in which the target platform's physical architecture—the design of the hardware itself—is replicated via a virtual model in software.

Two main types of emulation strategies currently are available in the emulation field. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs.

The other main emulation strategy is known as "translation", in which the target instructions are analyzed and decoded. This is also referred to as "recompilation" or "cross-compilation". It is well known that the execution speed of computer programs is often dramatically reduced by interpreters. It is not uncommon for a computer program to run ten to twenty times slower when it is executed via emulation than when the equivalent program is recompiled into target machine code and the target code version is executed. Due to the well known slowness of software emulation by interpretation, a number of products have successfully improved on the speed of executing source applications by translating portions of the target program at run time into host machine code, and then executing the recompiled program portions. While the translation process may take, e.g., 50 to 100 machine or clock cycles per instruction of the target code, the greater speed of the resulting host machine code is, on average, enough to improve the overall speed of execution of most source applications.

Emulation of the target platform by translation relies on blocks of translated instructions. As long as the emulated target platform memory including the original target platform code is unchanged, the target platform emulation can execute the corresponding translated instructions safely. However, certain sections of target code may be modified during normal operation of the target platform. As a result, a corresponding area of the target system memory is changed when the code is modified during operation. To emulate this, the host system may respond to a change in an area of memory by invalidating the corresponding translated target platform instructions. The potentially modified target platform instructions must then be retranslated. However, not all of the code in memory may have been changed and retranslating whole sections of previously translated code when only a few blocks are invalid can take up extra time and processor resources.

Thus, there is a need in the art, for a method and system for translation block invalidation that overcomes the above disadvantage.

SUMMARY OF THE INVENTION

The disadvantages associated with the prior art are overcome by embodiments of the present invention directed to invalidating blocks of translated code in emulation of a target system on a host system in which one or more components of the target system are emulated by translation of target system code. One or more blocks of target system code are translated by the host system to produce one or more corresponding blocks of translated code. The host system uses one or more native target system instructions as hints to invalidate or potentially invalidate one or more blocks of translated code. Blocks containing such hints cause the host system to mark some or all of the one or more blocks of translated code as potentially invalid. The potentially invalid blocks may be re-translated immediately. Alternatively, the potentially invalid blocks may be checked to see if the code in these blocks has been modified. If the code has been modified, corresponding blocks of target code may be re-translated.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the invention certain native EE instructions can be used as hints to invalidate or potentially invalidate one or more blocks of instructions and initiate a new translation. In response to these instructions, such as an EE cache invalidate instruction, the EE emulation marks all or some of the translated blocks of code as invalid and begins retranslation.

Figure 1A:
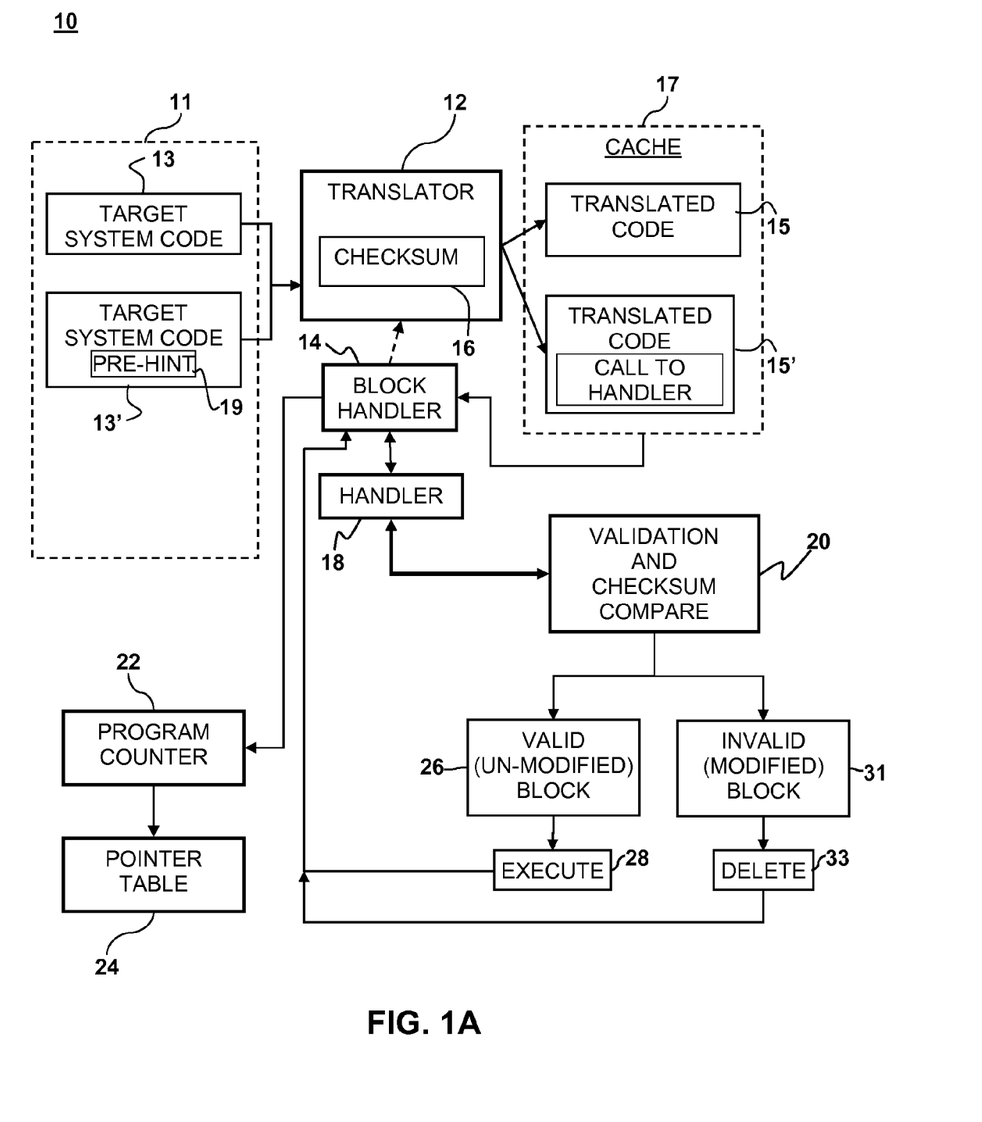
FIG. 1A is a block diagram illustrating an emulation software that uses translation block invalidation pre-hints according to an embodiment of the present invention.
Figure 1B:
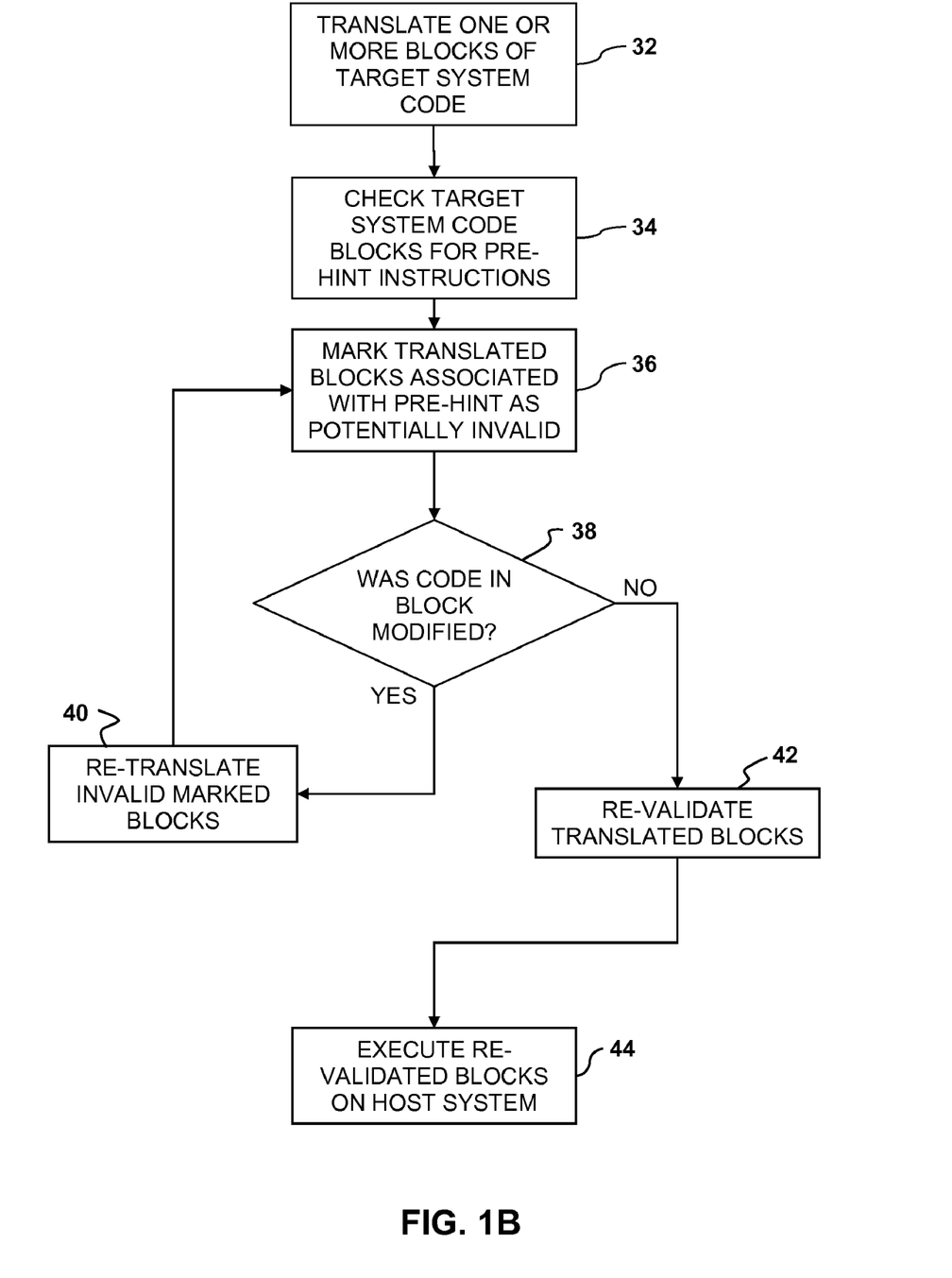
FIG. 1B is a flow diagram illustrating an emulation method that uses translation block invalidation pre-hints according to an embodiment of the present invention.

Embodiments of the present invention may be generally understood by reference to the software block diagram of FIG. 1A and the flow diagram of FIG. 1B. According to an embodiment of the invention, an emulation program 10 may include a translator 12 and a block handler 14. The translator 12 and the block handler 14 may be implemented as subroutines within the larger emulation program 10. The emulation program 10 is executed by one or more processors on a host system. The host system receives program instructions 11 encoded in a form suitable for execution by a target system. The program instructions 11 may be divided into blocks 13, 13'. The translator 12 translates the target system code blocks 13, 13' into corresponding blocks of translated code 15, 15' that are in a form that is executable by the host system. The translated code blocks 15, 15' are stored temporarily in a cache 17 on the host system. The block handler 14 runs the cached translated code blocks 15, 15', if any are available. If there are no translated code blocks in the cache 17, the block handler 14 calls on the translator 12 to perform a translation of blocks of target system code 11 as indicated by the dashed arrow.

Embodiments of the present invention make use of certain native instructions in the target system code 11 as pre-hints to whether a given block 13, 13' of target system code 11 is no longer valid as a result of a modification of the underlying target system code 11. For example, in normal operation the target system may generate a cache invalidation instruction when a block 13' of target system code has been modified during execution of the target system program 11. The cache invalidation instruction provides a pre-hint 19 that the target system block 13' may have been modified since it was translated and is therefore no longer valid. Other types of instructions that may be used as pre-hints include direct memory access from other processors or local memory in the target system, external events, such as external modification of random access memory (RAM) and software patches. When an invalidation pre-hint instruction 19 is detected in a target system code block 13' the translator 12 inserts an event check instruction into the corresponding block of translated code 15'. The translator 12 may also generate a hash or checksum 16 for the target system code block 13' upon translation.

The event check instruction may take the form of a call to a handler 18 to perform a validation and checksum compare 20 on the target system code block 13' containing the pre-hint instruction 19.

The checksum compare routine 20 accounts for the situation in which a block 13' contains a pre-hint instruction yet is still valid. The checksum routine 20 compares the hash or checksum 16 generated upon translation with a current checksum for the target system code block 13'. If the two hashes/checksums are the same, the translated block 15' has not been modified and the translated block 15' is a valid block 26. Otherwise, the target system code block 13' has been modified and is an invalid block 31. Valid translated blocks 26 may be executed at 28 by the block handler 14. Invalid translated blocks 31 or groups of blocks that are linked to an invalid block may be deleted at 33 and the memory space for that block may be overwritten. Overwriting the memory space may include marking the memory space as available for overwriting and subsequently overwriting the space with a new block of translated code 17. The block handler 14 then requests a new translation of modified target system code block 13'.

The translator 12, block handler 14 and checksum compare routine 20 may be configured to check and/or re-translate the invalidated or potentially invalidated blocks of translated code in any suitable order. By way of example, the blocks 15, 15' may be checked, validated and/or re-translated in most recently used (MRU) order.

If only some translated blocks 15, 15' are potentially invalidated (e.g., because they contain pre-hints 19), the valid blocks 15 may be executed until a potentially invalid block 15'. The checksum compare routine 20 may then check whether the potentially invalid block 15' is invalid. Alternatively, the potentially invalid block 15' may be re-translated without checking. If all of the blocks 15, 15' of translated code 17 are potentially invalidated, execution of the translated code in the cache 17 may be halted and the full resources of a host system processor may be devoted to verification and/or retranslation of the target system code underlying translated blocks 15, 15'.

In embodiments of the invention, the block handler 14 may generate a pointer table 24 that maps program counter values 22 for blocks of target system code to corresponding blocks of translated code. When translated blocks 15' are invalidated, one or more pointers in the pointer table 24 may be set to point to memory locations for one or more blocks corresponding to host system code for the block handler 14. To re-translate the target system code 11, the pointer table 24 is invalidated and then rebuilt so that the pointers in the pointer table 24 point to blocks of target system code that haven't been modified. With the pointer table 24 rebuilt in this manner, the translator 12 translates blocks of code 11 that haven't been modified.

An emulation method 30 that may be implemented by the software 10 may be understood by referring simultaneously to FIG. 1A and the flow diagram of FIG. 1B. Specifically, at 32, the translator 12 translates the blocks 13, 13' of target system instructions 11 into corresponding blocks 15, 15' of host-system code 17. Execution of the translated code 17 may result in a modification of the underlying target system code. At 34 the validator 14 checks the translated blocks 15, 15' for pre-hints 19 (e.g., cache invalidate instructions). The validator 14 marks blocks 15' containing these pre-hints as potentially invalid as indicated at 36. At 38 the checksum 16 may be used to determine whether the block 15' was modified. If it was modified, the block is marked as invalid and re-translated, as indicated at 40. The re-translated block may be check again for pre-hint instructions. If the block 15' was not modified, it is re-validated, as indicated at 42, and may be executed on the host system, as indicated at 44.

Figure 1C:
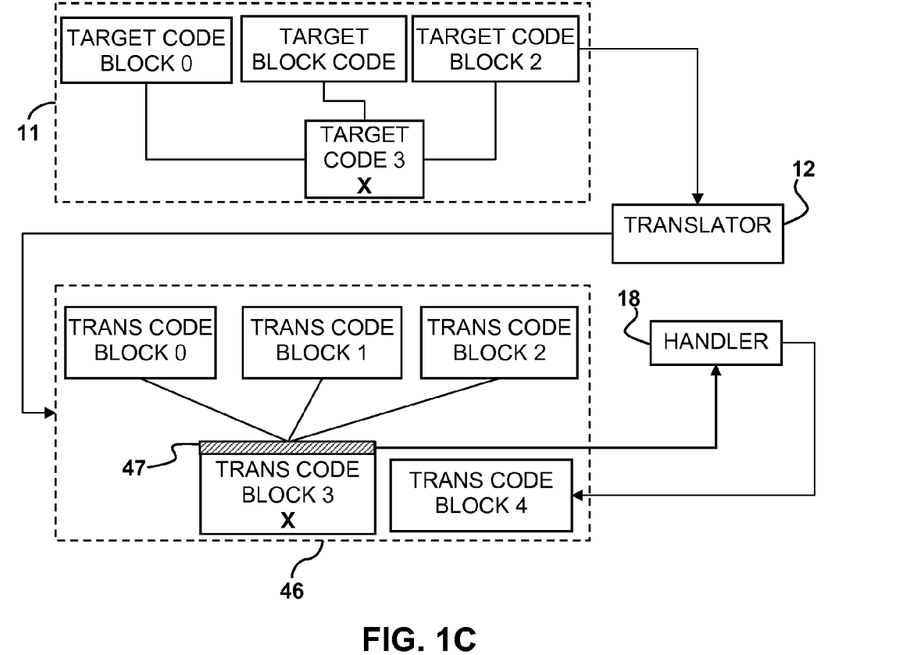
FIG. 1C is a block diagram illustrating the handling of chained instructions using translation block invalidation pre-hints according to an embodiment of the present invention.

Translations may be chained together so that a function call to the chained translations doesn't always require a pointer table look-up. Once a look-up has been done in the desired chain it can directly branch to the translated function. When a block in such a chain is invalidated the look-up table for this chain must be invalidated. It is also often necessary to keep track of which blocks of translated code are chained to each other and undo that chain. However, such unchaining may be avoided. For example, as shown in FIG. 1C, in some embodiments of the invention, one or more blocks of target system code 11 may be linked together in a chain. For example, target system blocks 0, 1 and 2 may include function calls to block 3. When these blocks are translated, the resulting translated code includes a similar linking of translated code blocks 0, 1, 2, and 3 into a chain 46 such that a look-up in the chain 46 will directly branch to a translated function (indicated as translated block 3). If translated block 3 is invalidated, e.g., because the underlying target system code block 3 has been modified, the target system code is retranslated generating re-translated block 4. The chaining of the translated blocks in the chain 46 would normally have to be undone once the underlying target system code has been re-translated. However, instead of deleting translated block 3 and undoing the chaining, a first instruction 47 in translated block 3 may be replaced with a jump to the handler 18. The handler 18 may then direct the jump to re-translated block 4. Thus, jumps from translated blocks 0, 1, or 2 to translated block 3 are re-directed by the handler to re-translated block 4. The handler 18 may use a link register to determine which translated instruction jumped to translated instruction 3. The term "link register" refers to a special purpose register which holds the address to return to when a function call completes. The handler 18 may determine what emulated target system code instruction should have been running at a point of invalidation, take an exception and re-translate any block of translated code that is linked to that emulated target system code instruction.

Figure 2A:
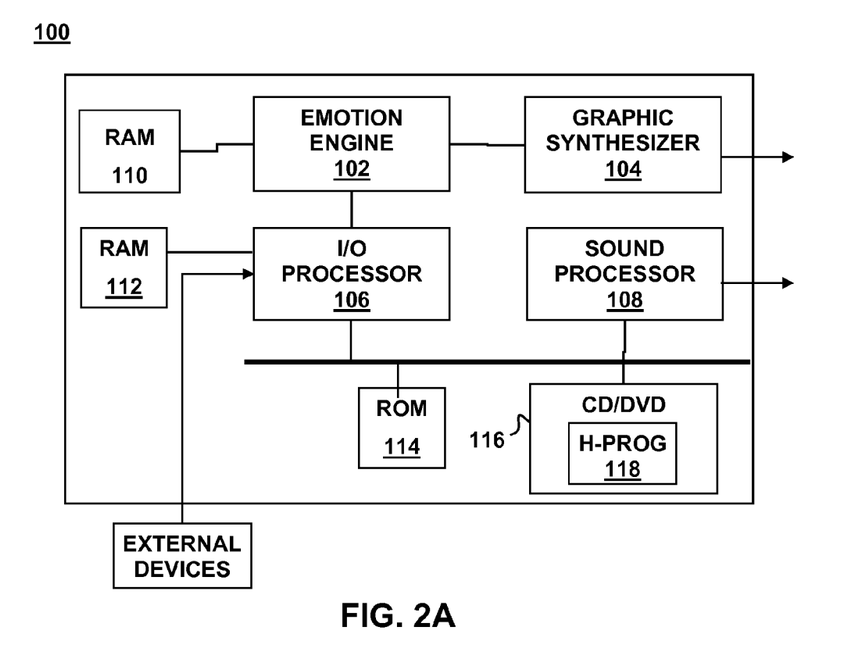
FIG. 2A is a block diagram of a target device that is to be emulated according to an embodiment of the present invention.

By way of example FIG. 2A depicts a block diagram of an example of a target system 100 in the form of a game console device, a Sony Playstation®2. PlayStation is a registered trademark of Sony Computer Entertainment Corporation of Tokyo, Japan. The target system 100 is built around a main processor module 102 referred to as an emotion engine, a Graphic Synthesizer 104, an input/output (I/O) processor (IOP) 106 and a sound processor unit 108. The emotion engine 102 typically includes a CPU core, co-processors and a system clock and has an associated random access memory (RAM) 110. The emotion engine 102 performs animation calculation, traverses a scene and converts it to a two-dimensional image that is sent to the Graphic Synthesizer (GS) 104 for rasterization.

Figure 2B:
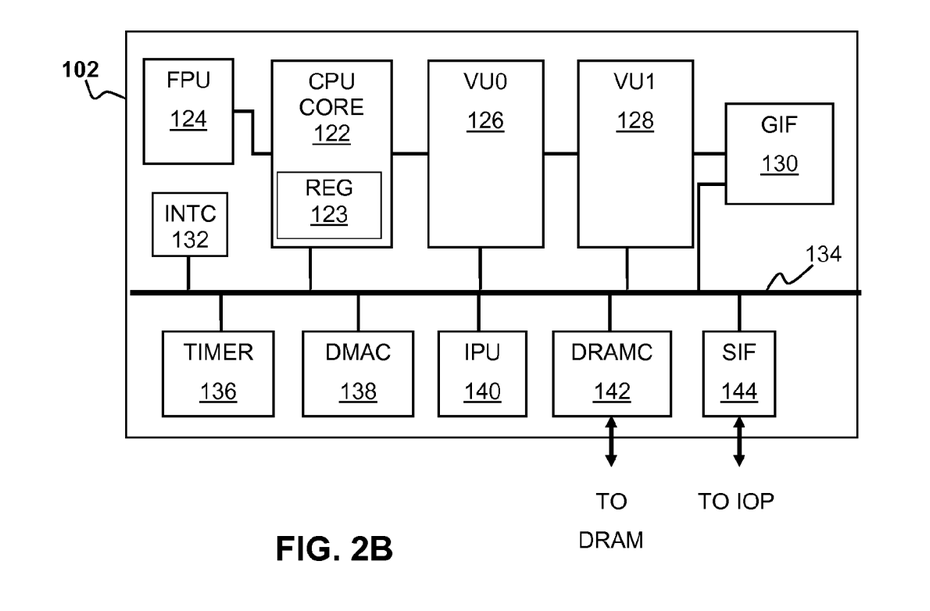
FIG. 2B is a block diagram of an emotion engine of the target device of FIG. 1A.

As shown in FIG. 2B, the EE 102 may include a CPU core 122, with an associated floating point unit (FPU) coprocessor 124, first and second vector co-processors 126, 128, a graphics interface controller 130 and an interrupt controller (INTC) 132. The CPU 122, vector co-processors 126, 128, GIF 130 and INTC 132 are coupled to a 128-bit main bus 134. The FPU 124 is directly coupled to the CPU 122. The CPU 122 is coupled to a first vector co-processor (VU0) 126, which is, in turn, coupled to a second vector co-processor (VU1) 128. The second vector co-processor VU1 128 is coupled to a graphics interface (GIF) 130. The EE 102 additional includes a timer 136, a direct memory access controller (DMAC) 138, an image data decompression processor (IPU) 140 a DRAM controller 142 and a sub-bus interface (SIF) 144 that facilitates communication between the EE 102 and the IOP 106.

The CPU core 122 may be a 128-bit processor operating at a 300 megahertz clock frequency using a MIPS instruction set with 64-bit instructions operating as a 2-way superscalar with 128-bit multimedia instructions. These instructions are handled using 128-bit registers 123. The CPU 122 may include a data cache, an instruction cache and an area of on-chip memory sometimes referred to as a scratchpad. The scratchpad serves as a small local memory that is available so that the CPU 122 can perform certain operations while the main bus 134 is busy transferring code and/or data. The first vector unit 126 may be used for animation and physics calculations. The second vector unit 128 may be used for geometry transformations. The GIF 130 serves as the main interface between the EE 102 and the GS 104.

The IOP 106 may include a processor for backwards compatibility with prior versions of the target system 100 and its own associated RAM 112. The IOP 106 handles input and output from external devices such as controllers, USB devices, a hard disc, Ethernet card or modem, and other components of the system such as the sound processor unit 108, a ROM 114 and a CD/DVD unit 116. A target program 118 may be stored on a CD/ROM disc loaded in the CD/DVD unit 116. Instructions from the target program 118 may be stored in EE RAM 110 or IOP RAM 112 and executed by the various processors of the target system 100 in a native machine code that can be read by these processors.

In embodiments of the present invention, target system instructions involving direct memory access (DMA) from the IOP 106 or the scratchpad, may be used as pre-hints for invalidation of translated target system code, as described above.

Figure 3:
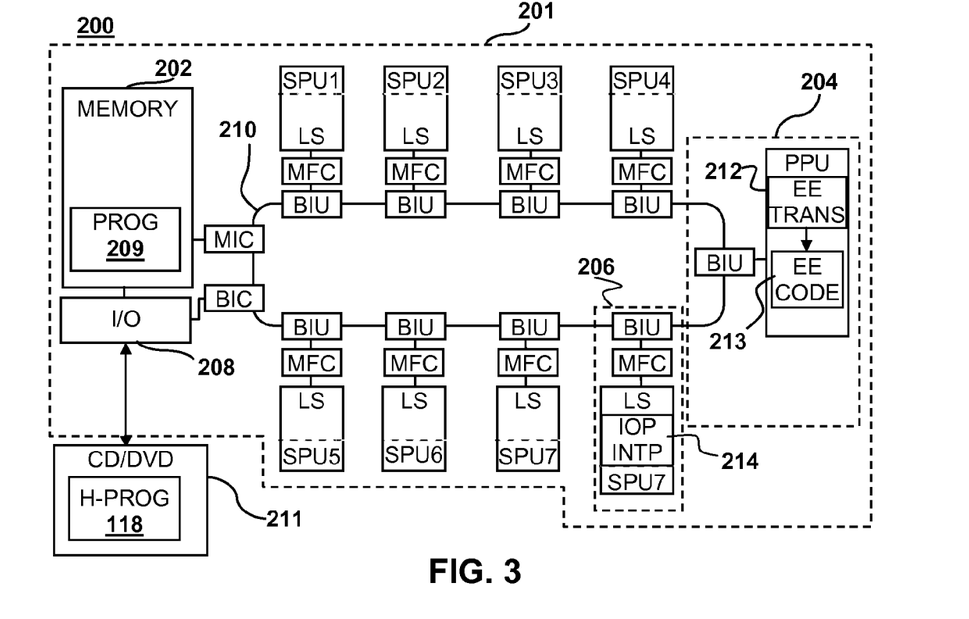
FIG. 3 is a schematic diagram of a host device that emulates the target device of FIGS. 2A-2B.

In embodiments of the present invention, the target system 100 may be emulated using a parallel processing host system 200 so that the host system 200 can run programs written in code native to the target system 100 such as target program 118. FIG. 3 depicts an example of a host system 200 based on a cell processor 201 that may be configured to emulate the target system 100. The cell processor 201 includes a main memory 202, a single power processor element (PPE) 204 and eight synergistic processor elements (SPE) 206. However, the cell processor 201 may be configured with more than one PPE and any number of SPE's. Each SPE 206 includes a synergistic processor unit (SPU) and a local store (LS). The memory 202, PPE 204, and SPEs 206 can communicate with each other and with an I/O device 208 over a ring-type element interconnect bus (EIB) 210. The PPE 204 and SPEs 206 can access the EIB 210 through bus interface units (BIU). The PPE 204 and SPEs 206 can access the main memory 202 over the EIB 210 through memory flow controllers (MFC). The memory 202 may contain an emulation program 209 that implements interpretation and translation of coded instructions written for the target system 100. The emulation program may include features such as those described above with respect to FIGS. 1A, 1B, and 1C. The coded target system instructions may be read from a CD/ROM disc in a CD/DVD reader 211 coupled to the I/O device 208. A CD/ROM disc containing the target program 118 may be loaded into the CD/DVD reader 211. In certain embodiments of the invention, the program 209 may track memory writes by the EE 102, GS 104, DMAC 138 and other processors in the target system 100 to determine whether to invalidate all or only a portion of the translated blocks of instructions.

By way of example, in an embodiment of the invention, a translator 212 running on the PPE 204 may emulate the EE 102 of the target system 100 by translating EE instructions of the target program 118 into machine code 213 that can be run on the PPE 204. In certain embodiments of the invention a dedicated SPE 206 may implement a software interpreter 214 that emulates the IOP 106 by interpreting IOP instructions of the target program 118.

When developing certain pieces of emulated code it may be necessary to invalidate an instruction cache (I-cache) to make sure that it is running coherent code. By way of example, the cache for the EE 102 may be emulated in memory 202. To invalidate an entry in the I-cache appropriately, instructions to overwrite the emulated I-cache may be trapped. In the case of PS2 emulation, two instructions may be trapped for invalidating—one for the EE 102 and one for VU1 128. Flushing the cache for the EE 102 typically requires retranslation of parts of EE code. The re-translated code has to match the code that is currently in memory 202. Thus, when executing a specific instruction to the I-cache to invalidate a particular entry it is important to keep track of which instructions straddle which cache translations. The idea is to look for event that requires re-optimization or recompiling of code, read the instruction, translate it to another instruction and change the state of the emulated machine.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In emulation of a target system on a host system in which one or more components of the target system are emulated by translation of target system code, a method for invalidating blocks of translated code, the method comprising:
   translating one or more blocks of target system code with the host system to produce one or more corresponding blocks of translated code;
   analyzing the one or more blocks of target system code for the presence of one or more native target system instructions indicative of modification of the target system code during execution; and
   if the one or more native target system instructions are present, marking some or all of the one or more blocks of translated code as potentially invalid; and
   re-translating one or more blocks of target system code corresponding to one or more blocks of translated code that have been marked as potentially invalid.

2. The method of claim 1, further comprising overwriting one or more memory locations corresponding to one or more blocks of translated code that have been marked as potentially invalid.

3. The method of claim 1 wherein the one or more native target system instructions include a cache invalidation instruction.

4. The method of claim 1, further comprising checking with the host system whether one or more blocks of translated code marked potentially invalid have been modified.

5. The method of claim 4, further comprising invalidating and re-translating the one or more blocks of target system code with the host system if the one or more blocks of target system code have been modified.

6. The method of claim 4 further comprising re-validating the one or more blocks of translated code that have been invalidated or potentially invalidated and executing the one or more re-validated blocks on the host system.

7. The method of claim 4 wherein checking with the host system whether the one or more blocks of target system code have been modified includes using a hash or checksum to determine whether the one or more blocks of code have actually been modified.

8. The method of claim 1 further comprising checking and/or re-translating the one or more invalidated or potentially invalidated blocks of translated code in most recently used (MRU) order.

9. The method of claim 1, further comprising,
   if only some translated blocks of target system code are potentially invalidated, executing one or more valid blocks of translated code until a potentially invalid block of translated code is reached.

10. The method of claim 9, further comprising checking whether the potentially invalid block is invalid and/or retranslating the potentially invalid block of translated code.

11. The method of claim 1, further comprising
   if all of the one or more blocks of translated target system code are potentially invalidated, halting execution of the translated target system code and devoting full resources of a host system processor to verification and/or retranslation.

12. The method of claim 1, further comprising generating a table of pointers with the host system, wherein the pointer table maps program counter values for blocks of target system code to corresponding blocks of translated code.

13. The method of claim 12, further comprising, when translated blocks are invalidated, setting one or more pointers in the pointer table to point to memory locations for one or more blocks of verification and/or retranslation code.

14. The method of claim 1 wherein translating one or more blocks of target system code includes linking two or more blocks of translated code together to form a chain such that a look-up in a first translated block will directly branch to a second translated block.

15. The method of claim 14, further comprising if the first translated block is invalidated, overriding a first instruction in the first translated block and jumping to a handler that redirects the branch to a block of re-translated code.

16. The method of claim 14, further comprising determining what emulated target system code instruction should have been running at a point of invalidation and taking an exception and re-translating any block of translated code that is linked to the emulated target system code instruction that should have been running at a point of invalidation.

17. A host system for emulation of a target system, comprising:
one or more host system processors;
a memory coupled to the one or more host system processors;
a set of processor executable instructions embodied in the memory, the processor executable instructions including instructions for implementing a method for invalidating blocks of translated code, the method comprising:
translating one or more blocks of target system code with the host system to produce one or more corresponding blocks of translated code;
analyzing the one or more blocks of target system code for the presence of one or more native target system instructions indicative of modification of the target system code during execution; and, if the one or more native target system instructions are present, marking some or all of the one or more blocks of translated code as potentially invalid; and
re-translating one or more blocks of target system code corresponding to one or more blocks of translated code that have been marked as potentially invalid.

* * * * *